US005576706A

United States Patent [19]

Daigle et al.

[11] Patent Number: 5,576,706
[45] Date of Patent: Nov. 19, 1996

[54] METHODS AND APPARATUS FOR USING MULTIPLE KEYBOARDS CONNECTED IN A DAISY CHAIN TO A KEYBOARD PORT OF A COMPUTER

[75] Inventors: Darrin P. Daigle, Santa Barbara, Calif.; John L. Hilburn, Baton Rouge, La.

[73] Assignee: Infogrip, Inc., Carpinteria, Calif.

[21] Appl. No.: 191,204

[22] Filed: Feb. 3, 1994

[51] Int. Cl.[6] ................................................. H03K 17/94
[52] U.S. Cl. .............................. 341/22; 341/20; 341/21; 364/709.01; 364/709.09
[58] Field of Search ................................. 341/20, 21, 22; 345/168, 169; 364/709, 709.01, 709.02, 709.03, 709.04, 709.12, 709.14

[56] References Cited

U.S. PATENT DOCUMENTS

| | | | |
|---|---|---|---|
| 2,319,273 | 5/1943 | Sterling | 400/93 |
| 2,387,330 | 10/1945 | Johnson et al. | 188/122 |
| 2,393,781 | 1/1946 | Johnson et al. | 192/41 R |
| 2,532,228 | 11/1950 | Hesh | 400/485 |
| 2,717,686 | 9/1955 | Seeber, Jr. | 400/98 |
| 3,022,878 | 2/1962 | Seibel et al. | 400/479 |
| 3,225,883 | 12/1965 | Ayres | 400/94 |
| 3,633,724 | 1/1972 | Samuel | 400/485 |
| 3,833,765 | 9/1974 | Hilborn et al. | 178/79 |
| 3,967,273 | 6/1976 | Knowlton | 341/22 |
| 4,029,915 | 6/1977 | Ojima | 200/5 A |
| 4,042,777 | 8/1977 | Bequaert et al. | 179/79 |
| 4,067,431 | 1/1978 | Whitaker | 197/98 |
| 4,081,068 | 3/1978 | Zapp | 400/485 |
| 4,201,489 | 5/1980 | Zapp | 400/485 |
| 4,344,069 | 8/1982 | Prame | 340/365 |
| 4,360,892 | 11/1982 | Endfield | 400/486 |
| 4,442,506 | 4/1984 | Endfield | 400/486 |
| 4,443,789 | 4/1984 | Endfield et al. | 400/486 |
| 4,467,321 | 8/1984 | Volnak | 345/168 |
| 4,502,038 | 2/1985 | Lowenthal et al. | 341/26 |
| 4,516,939 | 5/1985 | Crimmins, Jr. | 434/114 |
| 4,549,279 | 10/1985 | Lapeyre | 364/709 |
| 4,584,443 | 4/1986 | Yaeger | 200/6 A |
| 4,638,306 | 1/1987 | Rollhaus et al. | 341/22 |
| 4,679,030 | 7/1987 | Volnak | 345/168 |
| 4,680,572 | 7/1987 | Meguire et al. | 341/22 |
| 4,694,280 | 9/1987 | Rollhaus et al. | 341/22 |
| 4,715,736 | 12/1987 | McGunnigle | 400/484 |
| 4,727,478 | 2/1988 | Endfield et al. | 395/275 |
| 4,737,040 | 4/1988 | Moon | 400/110 |

(List continued on next page.)

FOREIGN PATENT DOCUMENTS

| | | |
|---|---|---|
| 0085645 | 8/1983 | European Pat. Off. . |
| 0279553 | 8/1988 | European Pat. Off. . |
| 2064187 | 6/1981 | United Kingdom . |

OTHER PUBLICATIONS

M. Gladwell, "Redesigning Illogical Keyboards," The Washington Post, Science Section, Sep. 18, 1989.
S. Owen, "Qwerty is Obsolete," Interface Age, Jan. 1978, p. 56.
P. M. Fitts. "The Influence of Response Coding on Performance in Motor Tasks".
Advertisement—Vatell Corporation, "Creating the Future With Technology".

(List continued on next page.)

*Primary Examiner*—John K. Peng
*Assistant Examiner*—Ashok Mannova
*Attorney, Agent, or Firm*—Finnegan, Henderson, Farabow, Garrett & Dunner, L.L.P.

[57] ABSTRACT

Multiple keyboards (chord or standard format) are connected in a daisy chain fashion to a computer using only the keyboard port of the computer. The keyboard system has an input connector and an output connecter, wherein a child keyboard system that includes a plurality of keys corresponding to characters is connected to the input connector and one of a computer and a parent keyboard system that includes a plurality of keys corresponding to characters is connected to the output connector.

17 Claims, 6 Drawing Sheets

U.S. PATENT DOCUMENTS

| | | | |
|---|---|---|---|
| 4,763,252 | 8/1988 | Rose | 364/200 |
| 4,775,255 | 10/1988 | Langley | 400/485 |
| 4,791,408 | 12/1988 | Heusinkveld | 341/22 |
| 4,804,279 | 2/1989 | Berkelmans et al. | 400/94 |
| 4,824,268 | 5/1989 | Diernisse | 400/486 |
| 4,833,446 | 5/1989 | Eilam et al. | 341/22 |
| 4,846,598 | 7/1989 | Livits | 400/472 |
| 4,852,043 | 7/1989 | Guest | 364/706 |
| 4,891,777 | 1/1990 | Lapeyre | 395/325 |
| 4,897,649 | 1/1990 | Stucki | 341/22 |
| 4,911,565 | 3/1990 | Ryan | 400/100 |
| 4,913,573 | 4/1990 | Retter | 400/489 |
| 4,917,516 | 4/1990 | Retter | 400/489 |
| 4,964,075 | 10/1990 | Shaver et al. | 359/727 |
| 5,017,030 | 5/1991 | Crews | 400/485 |
| 5,034,598 | 7/1991 | Poland | 235/435 |
| 5,062,070 | 10/1991 | Lapeyre | 364/709.16 |
| 5,087,910 | 2/1992 | Guyot-Sionnest | 340/711 |
| 5,090,013 | 2/1992 | Fadem | 370/85.8 |
| 5,122,786 | 6/1992 | Rader | 341/22 |
| 5,136,694 | 8/1992 | Belt et al. | 395/275 |
| 5,251,163 | 10/1993 | Rouhani | 364/709.12 |
| 5,410,333 | 4/1995 | Conway | 341/20 |
| 5,412,586 | 5/1995 | Oldfather | 364/709.1 |
| 5,459,462 | 10/1995 | Venkidu et al. | 341/20 |

OTHER PUBLICATIONS

Advertisement—Boswell Industries, Inc., "Word Processing for Mankind".

J. Jedamus & G. Wheelwright, "Designing a Speedier Keyboard," Newsweek, May 12, 1986, p. 3.

S. Dillingham, "Pressured Wrists Get Redesigned Keyboard," Insight On the News, Nov. 28, 1988, p. 45.

"Death of the Qwerty Keyboard," Design World, No. 8, 1985, pp. 36–43.

P. K. C. Maher & H. V. Bell, "The Man Machine Interface—A New Approach," 1976, pp. 122–125.

"A Computer in Every Hand," The Economist, Nov. 26, 1988, p. 76.

G. Derman, "Simpler, More Integrated Keyboards Hit the Market" pp. 71, 71 and 75.

D. Gopher, "The Contribution of Vision–Based Imagery to the Acquisition and Operation of a Transcription Skill," Cognition and Motor Processes, 1984, pp. 195–208.

N. Rochester, F. C. Bequaert, & E. M. Sharp, "The Chord Keyboard," IEEE, Dec. 1978, pp. 57–63.

H. C. Ratz & D. K. Ritchie, "Operator Performance on a Chord Keyboard," Journal of Applied Psychology, vol. 45, No. 5, 1961, pp. 303–308.

R. Conrad & D. J. A. Logman, "Standard Typewriter Versus Chord Keyboard—An Experimental Comparison".

L. R. Creamer & D. A. Trumbo, "Multifinger Tapping Performance as a Function of the Direction of Tapping Movements," Journal of Applied Psychology, vol. 44, No. 6, 1960, pp. 376–380.

J. I. Elkind & C. D. Forgie, "Characteristics of the Human Operator in Simple Manual Control Systems," IRE Transactions on Automatic Control May, 1959, pp. 44–55.

K. H. Eberhard Kroemer, "Human Engineering the Keyboard," Human Factors, 1972, 14(1), pp. 51–63.

I. Litterik, "Qwertyuiop—dinosaur in a computer age," New Scientist, Jan. 8, 1981, pp. 66–68.

A. Lundervold, "Electromyographic Investigations During Typewriting", pp. 226–233.

D. E. Rumelhart & D. A. Norman, "Simulating a Skilled Typist: A Study of Skilled Cognitive–Motor Performance," Cognitive Science, vol. 6, 1982, pp. 1–36.

R. Conrad, "Letter Sorting Machines—Paced, 'Lagged' or Unpaced?" pp. 149–157.

D. Raij. D. Gopher & R. Kimchi, "Perceptual and Motor Determinants of Efficient Data Entry," Proceedings of the Human Factors Society, 31st Annual Meeting, 1987, pp. 820–824.

D. Gopher, D. Karis & W. Koenig, "The Representation of Movement Schemes in Long Term Memory": Lessons from the Acquisition of a Transcription Skill, Acta Psychologica 60, 1985, pp. 105–134.

D. Gopher, "Experiments with a Two Hand Chord Keyboard–The Structure and Acquisition Process of a Complex Transcription Skill", Report for the U.S. Office of Naval Research, Aug. 1986, pp. 1–63.

D. Gopher & D. Raij. "Typing with a Two–Hand Chord Keyboard: Will the Qwerty Become Obsolete?," IEEE Transactions on Systems, Man, and Cybernetics, vol. 18, No. 4, Aug. 1988, pp. 601–609.

Vatell Corporation, "Tests of a Ternary Chord–Type Keyboard," Final Report, 1987, pp. 1–65.

H. M. Bowen & G. V. Guinness, "Preliminary Experiments on Keyboard Design for Semiautomatic Mail Sorting," Journal of Applied Paychology, vol. 49 No. 3, 1965, pp. 194–198.

M. Levy, "The Electronic Aspects of the Canadian Sorting of Mail System," Computers.

R. Seibel, "Performance on a Five–Finger Chord Keyboard," Journal of Applied Psychology, vol. 46, No. 3, 1962, pp. 165–169.

Copy of International Search Report, mailed Oct. 28, 1992.

METHODS AND APPARATUS FOR USING MULTIPLE KEYBOARDS CONNECTED IN A DAISY CHAIN TO A KEYBOARD PORT OF A COMPUTER

FIELD OF THE INVENTION

This invention relates to chord keyboard systems and, more particularly, to a method of connecting and using multiple keyboards (e.g., chord keyboard or modified standard format keyboard) connected in a daisy chain fashion to a keyboard port of a personal computer (e.g., an IBM or IBM compatible personal computer). The invention facilitates the communication between multiple keyboards and the personal computer using the keyboard port of the personal computer.

BACKGROUND OF THE INVENTION

In recent years, alternatives to the standard keyboard for communicating with computers have generated a lot of interest. For example, touch screen systems have been developed that permit users to touch an area of a special display screen, which signals the computer to perform a programmed function. The mouse has also grown in popularity with the general acceptance of WINDOWS™, and the like, among personal computer users. And voice recognition systems have also gained popularity, however, such systems have not yet been perfected.

Although these alternatives exist, no viable, complete replacement for the standard keyboard has been developed, with one exception, the chord keyboard. In other words, standard keyboards are still used with systems that have touch screens and/or mouses.

Touch screens cannot replace the standard keyboard because it is difficult, for example, to perform word processing functions using a touch screen without a standard keyboard for typing. Similarly, the mouse cannot replace the standard keyboard to perform word processing functions. Although voice recognition systems could replace the standard keyboard, such systems still cannot provide the advantages of the present invention described below.

In contrast, the chord keyboard provides an alternative method of inputting information and commands to a computer using fewer keys than the number of keys included in the standard keyboard. This is accomplishing by assigning characters and functions associated with a single key on the standard keyboard to a single key or group of keys included in the chord keyboard. For example, a user enters the letter "a" using a standard keyboard by merely pressing the key marked with the letter "A" on the keyboard. Using a chord keyboard, however, the user might enter the letter "a" by pressing a "chord", that is, a single key or a combination (or group) of keys simultaneously. Thus, with chord keyboards users can communicate commands and enter information (e.g., characters, numbers, etc.) into a computer in a manner similar to that used with standard keyboards.

Examples of chord keyboard systems are illustrated in U.S. Pat. Nos 4,360,892; 4,442,506; 4,833,446; 5,087,910; and 4,727,478. U.S. Pat. No. 4,727,478 discloses a device for connecting multiple chord keyboards to a single computer. This patent also specifies that each of the chord keyboards is a "portable word processor described in U.S. Pat. No. 4,360,892" (col. 3, lines 7–8).

U.S. Pat. No. 4,360,892 discloses a portable word processor of the type illustrated in FIG. 2 of U.S. Pat. No. 4,727,478. The portable word processor includes a microprocessor. Thus, U.S. Pat. No. 4,727,478 discloses a system where multiple chord keyboards, each containing its own microprocessor, are connected to a host computer. However, each chord keyboard is connected to a separate connector. Thus, to connect four chord keyboards to the host computer, four separate connectors would be required. Additionally, this configuration does not permit one user using a chord keyboard to monitor and, if necessary, to override commands and or information being input to the host computer by another user on a different chord keyboard.

U.S. Pat. No. 5,136,694 discloses a device for facilitating communication between two keyboards and a single processor. U.S. Pat. No. 5,136,694 discloses a computer (10) having an internal keyboard (11). An internal keyboard processor (14) monitors signals from a system control processor (28), a connector (15), and internal keyboard keys (12) in order to facilitate transfers between the system control processor (28) and the internal keyboard (11), as well as transfers between the system control processor (28) and an external keyboard (21). In summary, the internal keyboard has an internal processor that controls input to a computer from another external keyboard. The external keyboard is thus connected to the computer via the processor of the internal keyboard. This device is thus limited to the internal keyboard and a single external keyboard. In other words, without the aid of the present invention discussed below, another chord or standard format keyboard cannot be connected to the internal or external keyboard.

Accordingly, these prior art chord keyboard systems, as well as the standard keyboard, share a significant disadvantage. They do not permit the user to connect multiple keyboards (chord or standard format) to a computer using only the keyboard port of the computer. Connecting multiple keyboards (chord or standard format) to a single keyboard port has many applications, some of which will be described below with reference to the preferred embodiment of the present invention. Other applications will be apparent to one skilled in the art given the description of the preferred embodiment and the example applications of the present invention.

OBJECTS AND SUMMARY OF THE INVENTION

It is therefore an object of the present invention to provide for a device that permits users to connect multiple keyboards (chord or standard format) in a daisy chain fashion to a computer using only the keyboard port of the computer.

It is also an object of the present invention to provide for a device that permits users to connect multiple keyboards (chord or standard format) to a computer using only the keyboard port of the computer.

It is a further object of the present invention to provide for a device that permits users to connect a chord keyboard to a computer using only the keyboard port of the computer and to connect another keyboard (chord or standard format) to the chord keyboard connected to the computer.

It is still a further object of this invention to provide a device that permits users to connect a standard format keyboard to a computer using only the keyboard port of the computer and to connect another keyboard (chord or standard format) to the standard format keyboard connected to the computer.

It is yet another object of the present invention to provide a method for communicating between a computer and multiple keyboards (chord or standard format) connected in a daisy chain fashion to the keyboard port of the computer.

It is a further object of the present invention to provide a method for communicating between a computer and a chord keyboard connected to a keyboard port of the computer and another keyboard (chord or standard format) that is connected to the chord keyboard connected to the computer.

It is yet a further object of this invention to provide a method for communicating between a computer and a standard format keyboard connected to a keyboard port of the computer and another keyboard (chord or standard format) that is connected to the standard format keyboard connected to the computer.

It is also an object of the present invention to provide a method for transmitting (downloading) information to a chord keyboard (or modified standard keyboard) connected to a computer, thus permitting the chord keyboard (or modified standard keyboard) to store the information and use it during later communication with the computer.

To achieve the objects of this invention and attain its advantages, broadly speaking, this invention uses a keyboard system comprising a plurality of keys corresponding to alphanumeric characters, an input connector for connecting the keyboard system to a child keyboard system that includes a plurality of keys corresponding to alphanumeric characters, an output connector for connecting the keyboard system to a one of a computer, via a keyboard port of the computer, and a parent keyboard system that includes a plurality of keys corresponding to alphanumeric characters, a receiving means, and a processing and outputting means.

The receiving means receives an input character generated by pressing at least one of the plurality of keys of the keyboard system, the child keyboard system, and the parent keyboard system when the child keyboard system is connected to the input connector and the parent keyboard system is connected to the output connector. The receiving means also receives an input character generated by pressing at least one of the plurality of keys of the keyboard system and the child keyboard system when the child keyboard system is connected to the input connector and the keyboard system is connected to the computer. Finally, the receiving means receives an input character generated by pressing at least one of the plurality of keys on the chord keyboard system when the chord keyboard system is connected to the computer.

The processing and outputting means processes the received input character, and outputs a processed character to the computer when computer is connected to the output connector, to the parent keyboard system when the parent keyboard system is connected to the output connector, and to the child keyboard system when the child keyboard system is connected to the input connector.

The present invention, therefore, would permit several users to enter information to a single computer using only one keyboard connector. This application may be useful during a conference when more than one user may wish to use the same computer at the same time.

The present invention may also be used for training purposes. For example, with the present invention, a keyboard connected directly to the keyboard port of the computer may override commands from other keyboards connected to the keyboard connected to the keyboard port of the computer.

In yet another use, the present invention can reduce the number of computers required by particular businesses. For example, in some businesses each computer user does not need to access the computer at the same time. Accordingly, all users can use the same computer. With conventional standard format and chord keyboards, however, only one keyboard can be connected to the computer. Each user would then have to have access to the same keyboard. Alternatively, the computer would have to include multiple keyboard ports to accommodate all of the attached keyboards. In contrast, with the present invention, each user can have his/her own keyboard and display, and access the same computer, thereby eliminating the need for multiple computers and multiple keyboard ports.

The accompanying drawings which are incorporated in and which constitute part of this specification, illustrate an embodiment and implementation of the invention and, together with the description, explain the principles of the invention.

BRIEF DESCRIPTION OF DRAWINGS

FIG. 9 is pseudo code that illustrates the operational flow of the daisy chain process included in the firmware depicted in FIG. 8.

DETAILED DESCRIPTION OF THE PREFERRED EMBODIMENT

Reference will now be made in detail to the preferred embodiment and implementation of the present invention as illustrated in the accompanying drawings. Whereever possible, the same reference numbers will be used throughout the drawings and the following description to refer to the same or like parts.

The present invention is preferably implemented in a chord keyboard that will be discussed in detail below. First, it is appropriate to discuss an exemplary computer system used with the chord keyboard. It is also appropriate to discuss the operation of a standard keyboard that is generally used with the computer system and may also be used with the chord keyboard according to the present invention.

A. Computer System

Figure 1:
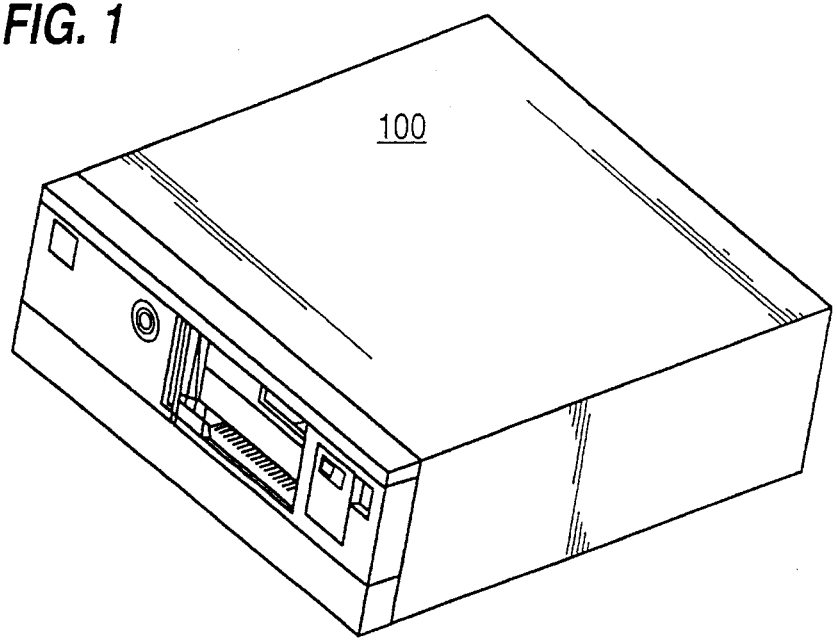
FIG. 1 is an illustration of a exemplary personal computer that may be used with the preferred embodiment of the present invention.

FIG. 1 is an illustration of the type of personal computer 100 capable of being used with the present invention. FIG. 1 is an illustration of the AST® Bravo 386SX/20 personal computer; however, as will be clear from the following description of the present invention, other computers, including other personal computers, workstation computers, and minicomputers may be used with the present invention.

Personal computers like the one depicted in FIG. 1 have external ports and connectors located on the exterior (i.e., the rear) of the computer. These ports and connectors are used to connect external devices, for example, keyboard and printer, to the personal computer 100.

Figure 2:
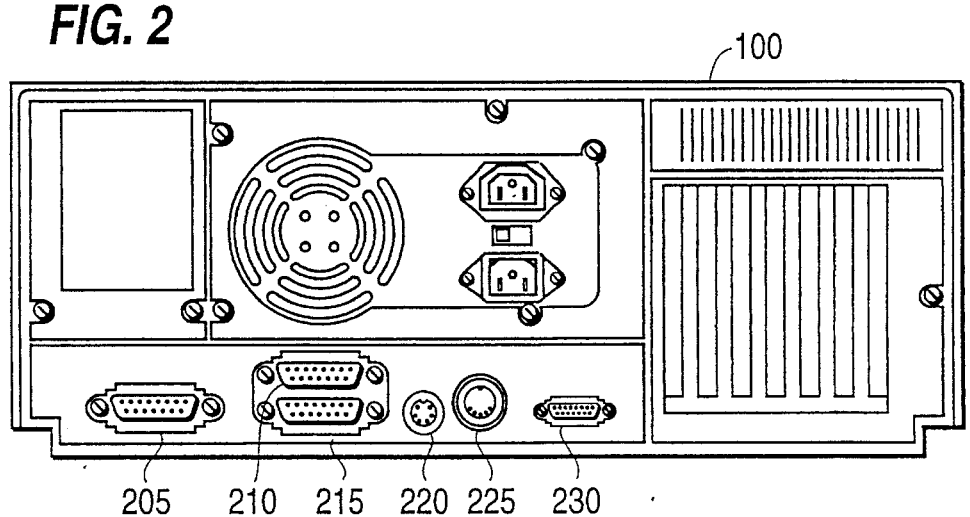
FIG. 2 is an illustration of the rear end of the personal computer shown in FIG. 1.

FIG. 2 is a rear view of the computer 100 depicted in FIG. 1. FIG. 2 illustrates examples of the types of external ports and connectors commonly included on personal computers. These same types of ports and connectors are also used with other computers, for example, workstation computers. The ports and connectors illustrated in FIG. 2 include two serial ports 205 and 210, a parallel port 215, a mouse connector 220, a keyboard connector 225, and a video port 230. The other external parts of the personal computer 100 depicted in FIG. 2 are not important to the discussion of the present invention and, therefore, the present application does include a description of those external parts.

The serial ports 205 and 210 are used to connect external peripheral devices like modems, printers, and other peripherals to the computer 100. The parallel port 215 is used to connect external peripheral devices like printers to the computer 100. Serial ports are used to transmit data one bit at a time (during a single clock interval) to and from a peripheral, e.g., a modem. Parallel ports, however, are used to transmit data eight bits at a time (during a single clock interval) to and from a peripheral, e.g., a printer.

The mouse connector 220 is used to connect a mouse to the computer 100, and the keyboard connector 225 is used to connect a keyboard to the computer 100. (In other configurations, mouses and keyboards may be connected to the serial ports.) Finally, the video port 230 is used to connect a display to the computer 100.

Figure 3:
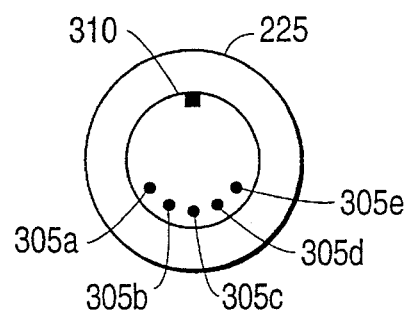
FIG. 3 provides a detailed view of the keyboard connector illustrated in FIG. 2.

FIG. 3 provides a closer look at the keyboard connector 225 of the computer 100. The keyboard connector 225 is a female connection and includes five pin holes 305a–e. These pin holes 305a–e are used to receive the pins of a male connection or plug (not shown) at the end of a keyboard cable (not shown); the other end of the cable being connected to a keyboard. Finally, the keyboard connector 225 also includes a cutout portion 310 that is used to guide the male connection (not shown) so that it is properly inserted into the connector 225 and the pins of the male connection are aligned properly with the pin holes 305a–e. The five pins of the male connection and pin holes 305a–e transmit a clock signal, data, ground, power (i.e., 5 Volts), and a reset signal between, for example, a keyboard and the computer 100.

Figure 4:
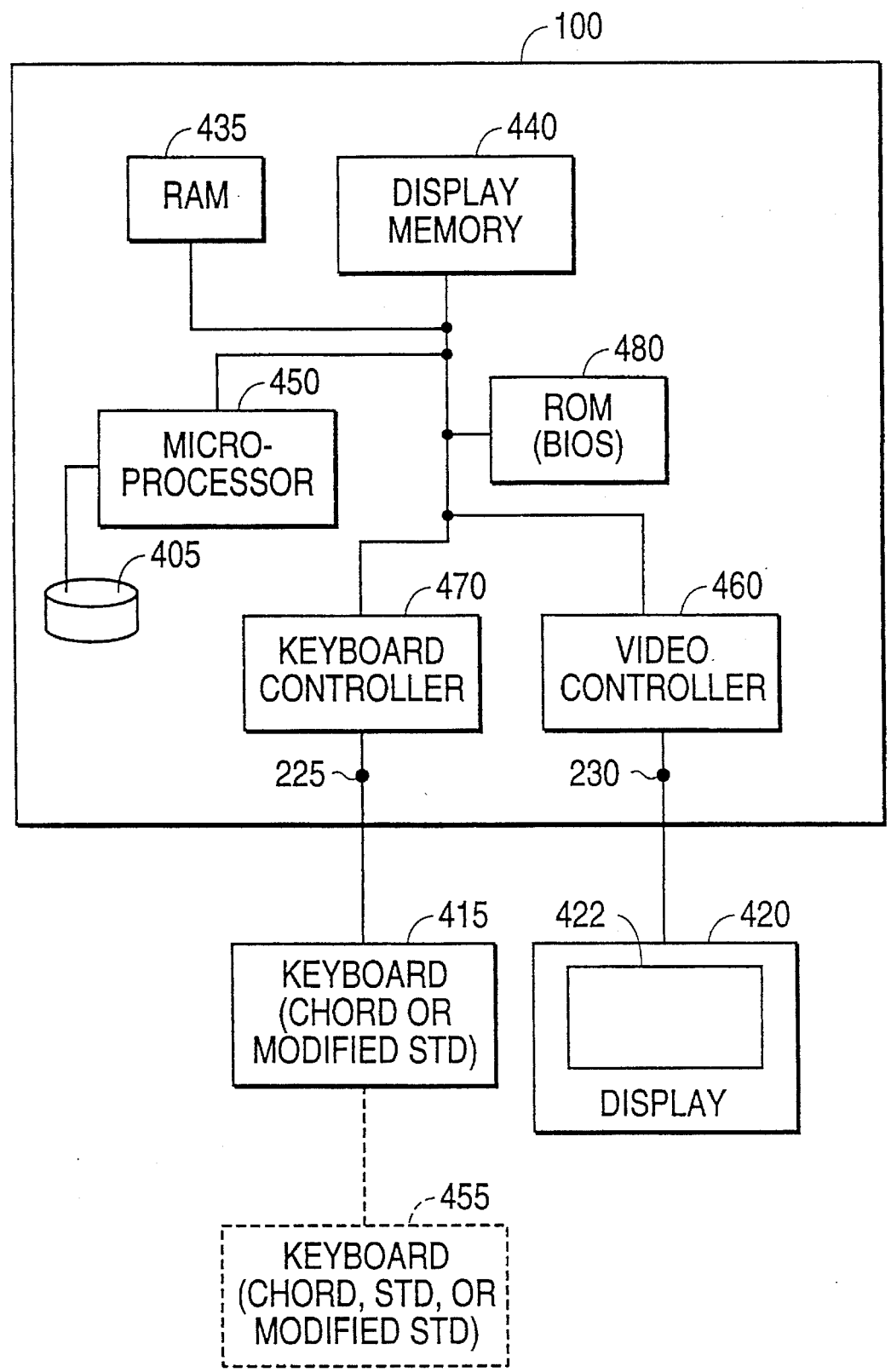
FIG. 4 is a block diagram illustrating the components of the personal computer shown in FIG. 1.

Referring to FIG. 4, the components of the computer 100 will be explained. For purposes of the remaining discussion, the computer 100 is a PS/2 personal computer manufactured by IBM Corporation. The computer 100 is comprised of a random access memory unit (or RAM) 435, a display memory unit 440, a microprocessor 450, a disk 405, a ROM BIOS (basic input output system) 480, a keyboard controller 470, and a video controller 460. The computer 100 may include additional components, for example, a floppy disk drive. In general, these units are all well known; however, as is appropriate certain of these units will be described further below.

Display 420 is connected to the video controller 460 via the video port 230. The display 420 is comprised of a display screen 422 for displaying graphic and alphanumeric information output from the computer 100. Display memory 440 is a specialized section of RAM which is used to store bit patterns (pixel data) that are read out by the video controller 460 in an appropriate synchronization with the display beam of the display 420 in order to provide the desired display graphics and text on the screen 422.

The disk drive 405 is also conventional and is provided to permit the ready interchange of control and application software and to provide a source of mass storage for the computer 100.

Figure 5:
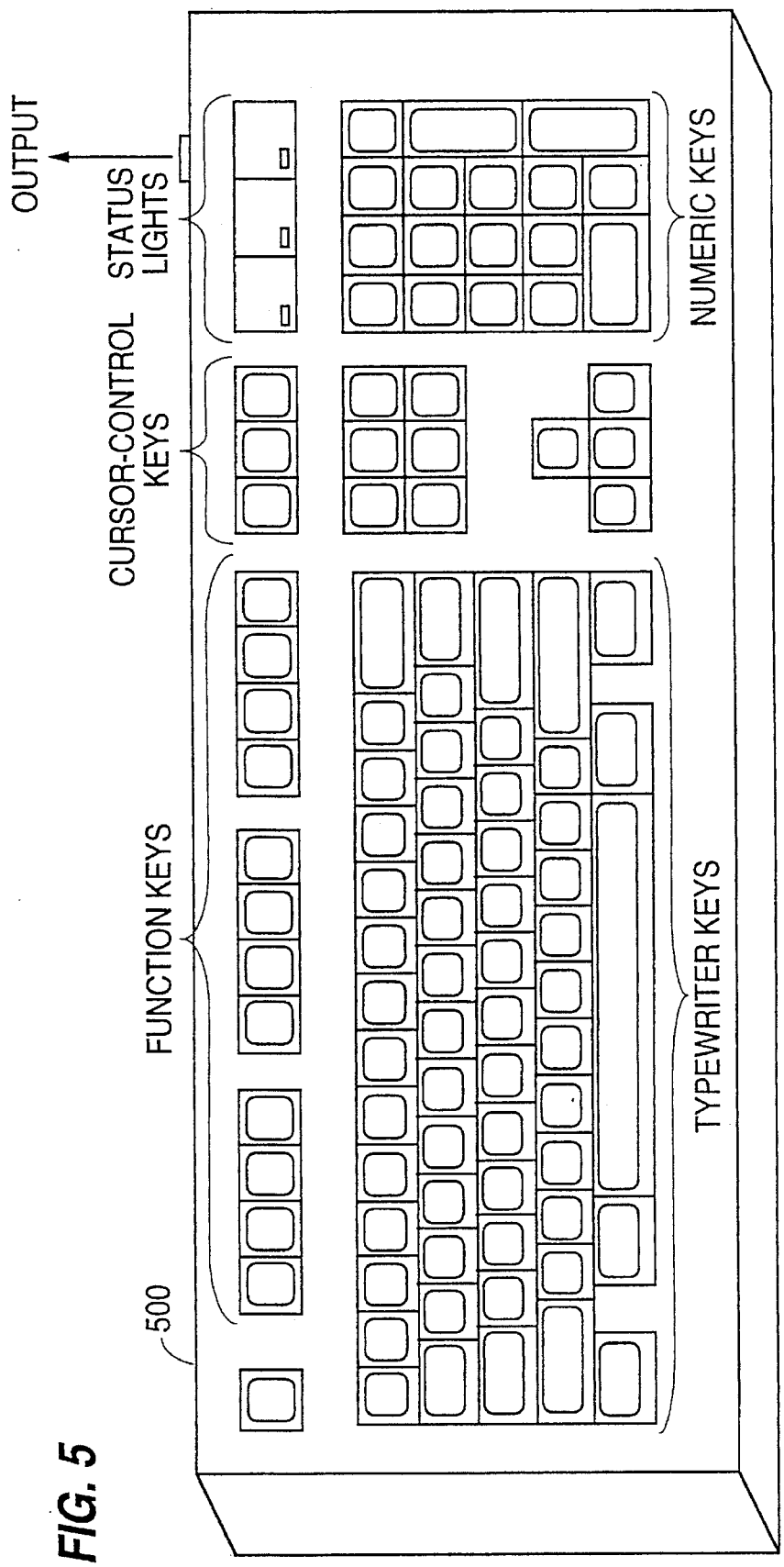
FIG. 5 shows a standard format keyboard that may be connected to the personal computer of FIG. 1.

Using a conventional keyboard cable, standard keyboards of the type illustrated, for example, in FIG. 5 are generally connected to the keyboard controller 470 via the keyboard connector 225. As described more fully below, the keyboard 415, in conjunction with the keyboard controller 470 and the ROM BIOS 480, acts as a means of inputting information into the microprocessor 450.

According to the present invention, at least one chord or modified standard keyboard 415 is connected to the keyboard port 225 of the computer 100. Also, one or more additional chord or modified standard keyboards, depicted in FIG. 4 by the chord or modified standard keyboard 455, may be connected to the computer 100 via the keyboard 415 and the keyboard port 225. Alternatively, a standard keyboard, i.e., keyboard 500, may be connected to the keyboard 415.

The following is a brief description of the operation of the standard keyboard 500 illustrated in FIG. 5 connected to the personal computer 100. This description will be useful to a complete understanding of the present invention provided below. Other keyboards may operate differently from the following description; however, the following description may be useful to a complete understanding of the present invention.

B. Standard Keyboard

The standard keyboard 500 includes a set of typewriter keys (in the QWERTY keyboard arrangement), cursor-control keys, functions keys, and numeric keys. The functions of these keys are well known. The standard keyboard 500 also includes a number of status lights, including a status light for a Num Lock mode, a Caps Lock mode, and a Scroll lock mode. The function of these status lights and the different modes are also well known.

The standard keyboard 500 includes a microprocessor (e.g., the 8048 microprocessor manufactured by Intel Corporation) built into the keyboard 500 (not shown in FIG. 5) and a memory buffer (also not shown in FIG. 5). The output of the standard keyboard 500 is connected to a keyboard cable that has a male connection to connect the keyboard 500 to the computer's 100 connector 225.

Generally speaking, pressing a key on the keyboard 500 causes a change in the current flowing through circuits associated with that key. The built-in keyboard microprocessor constantly scans the circuits leading to all of the keys. It detects a signal corresponding to the increase or decrease in current from the key that has been pressed. By detecting either a signal signifying an increase or a signal signifying a decrease in current, the built-in keyboard microprocessor can tell both when a key has been pressed and when it has been released. Each key has a unique signal, even if to the user the keys seem identical. For example, the built-in keyboard microprocessor can distinguish between the left and right shift keys because each key has a different signal. To distinguish between a real signal from a key and an aberrant current fluctuation, the built-in keyboard microprocessor repeats the scan many times each second. Only signals detected by the built-in keyboard microprocessor for several consecutive scans are acted upon by the built-in keyboard microprocessor.

Depending on which key's circuit carries a signal to the built-in keyboard microprocessor, the microprocessor generates a number, called a scan code. There are two scan codes for each key, one for when the key is pressed and the other for when it is released. The built-in keyboard microprocessor stores the scan code in the keyboard's 500 memory buffer, and sends the scan code to the computer via the connector 225 and the controller 470 (see FIGS. 2, 3, and 4) where it can be read by the computer's 100 ROM BIOS 480. Then the keyboard controller 470 sends an interrupt signal to the ROM BIOS 480.

The ROM BIOS 480 contains an interrupt handler that reads the scan code from the keyboard controller 470, and processes it. The ROM BIOS 480 then sends a signal to the keyboard 500, via the controller 470, that tells the keyboard 500 that the ROM BIOS 480 received the scan code.

The ROM BIOS 480 includes a scan code table. The scan code table includes scan codes and the identification of, for example, characters associated with the scan code. For example, a scan code for the letter "A" is "1E", the letter "B" is "30", and the letter "C" is "2E".

If the scan code is for one of the keys that are considered to be special shift keys and toggle keys, for example, Shift, Ctrl (control key), Alt (alternate key), Num Lock, Caps Lock, or Scroll Lock, the ROM BIOS 480 changes two bytes in a special buffer area to maintain a record of which of these keys has been pressed. Toggle keys are generally used to change the current status of the keyboard. For example, when a user presses the Num Lock key, the status of the keyboard 500 changes and the numeric keys can be used as a number pad to enter numbers into the computer 100. When none of the toggle keys has been pressed, the current status of the keyboard 500 is said to be a default status, and the two bytes in the special area of the buffer do not reflect a status change. If the scan code is for Num Lock, Caps Lock, or Scroll Lock, the ROM BIOS 480 transmits a signal to the keyboard built-in microprocessor (via the controller 470) to generate a signal to light the appropriate status light on the keyboard. For the Shift, Ctrl (control key) and Alt (alternate key), however, the ROM BIOS 480 does not transmit a signal to the keyboard built-in microprocessor to change a status light.

Finally, for all other keys, the ROM BIOS 480 checks the two bytes in the special buffer area to determine the status of the shift and toggle keys. Depending on the status indicated by two bytes, the ROM BIOS 480 translates the appropriate scan code into an ASCII code, used by the microprocessor 450, that stands for a character, a number, a function key, or a cursor movement key. (Uppercase and lowercase characters have different ASCII codes.) In either case, the ROM BIOS 480 places the ASCII or special key code into the computer's 100 RAM 435, where it can be processed by microprocessor 450.

C. Chord Keyboard With Daisy Chain Capability

Figure 6:
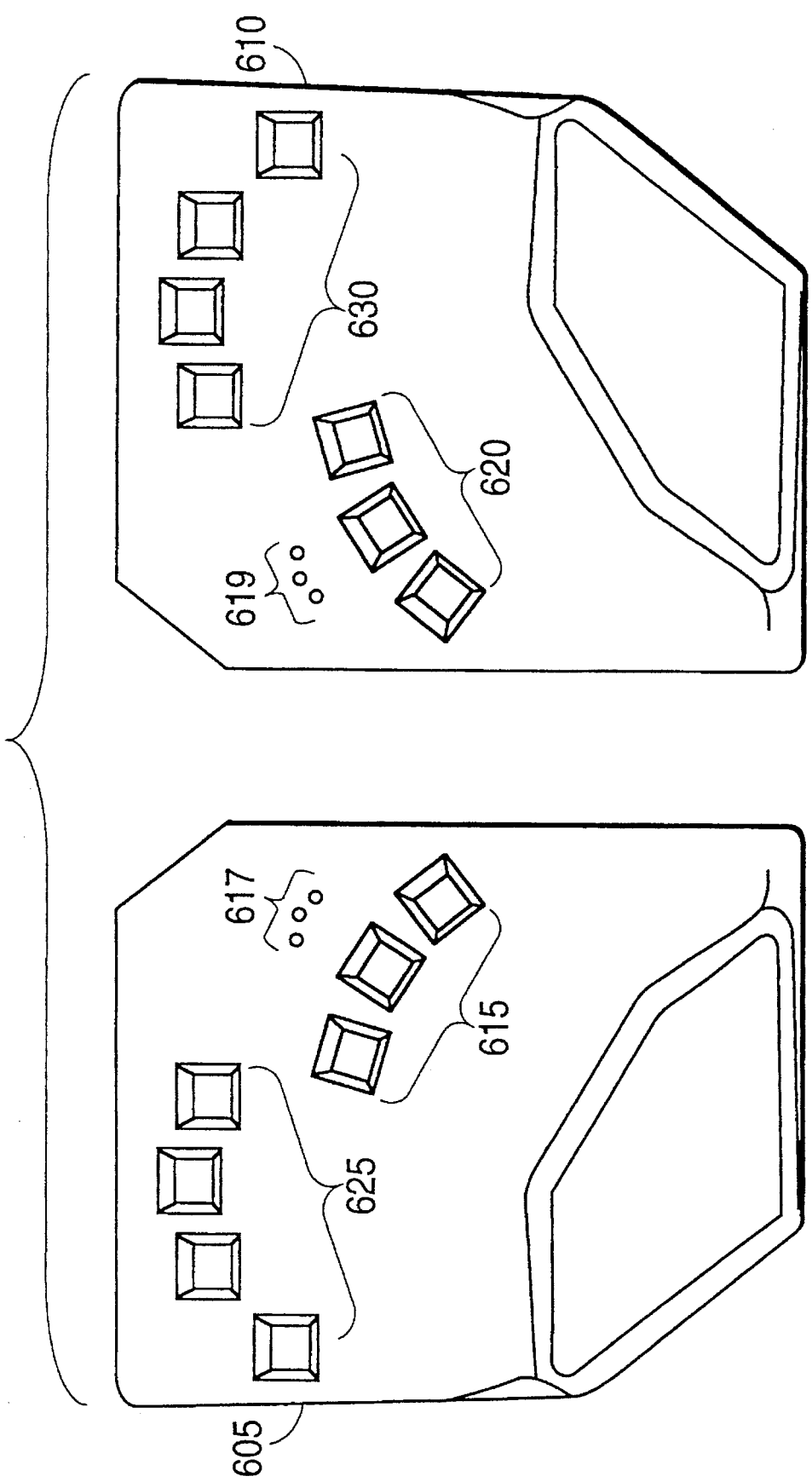
FIG. 6 shows the preferred embodiment of the present invention.

As stated above, the present invention is preferably implemented in a chord keyboard. FIG. 6 illustrates a top exterior view of two chord keyboards, one right handed and one left handed, each of which may be connected to the personal computer 100 of FIG. 1. The chord keyboards 605 and 610 are ergonomically designed so that users will feel comfortable using them individually or together.

In FIG. 6, each chord keyboard (a left handed 605 and right handed chord keyboard 610) includes two groups of keys: a thumb group comprised of three keys 615 and 620, and a finger group comprised of four keys 625 and 630. As explained in U.S. patent application Ser. No. 07/722,326, commands and functions of the standard keyboard, e.g., the keyboard 500, may be entered into a computer, e.g., the computer 100, using only the two groups of keys 615 and 625 on the chord keyboard 605. This is because using chord keyboards 605 and 610, users enter a "chord" that consists of a single key or a combination of keys, which corresponds to, for example, a character, number, cursor key, function key, or the like of a standard keyboard. In operation, a user enters a chord that generates a signal corresponding to a scan code that is transmitted to the computer 100 that, in a manner similar to that described above with regard to the operation of the standard keyboard 500, translates that scan code into an appropriate character, number, etc.

As discussed more fully below, one aspect of the preferred embodiment is that it provides the capability to process a special type of chord called the "word chord". The word chord is unique in that when a user enters a single chord or group of chords corresponding to a character, word, or group of words, called a "short form", followed by the word chord, the keyboard 605 according to the preferred embodiment "expands" the input character, word, or group of words into a "long form", that is, a character, word, or group of words that corresponds to the short form. In this manner, a user can enter the chord for the character "g" followed by the word chord, and keyboard 605 expands the letter "g" into the text for the Gettysburg Address.

Each chord keyboard 605 and 610 also includes three status lights 617 and 619, respectively, including blue, yellow, and red lights. In a manner similar to the status lights on the standard keyboard 500, the three status lights on the chord keyboard 605 (or 610) indicate a current status or mode of operation. Unlike the standard keyboard 500, however, the status lights on the chord keyboard 605 (or 610) indicate the following modes:

(1) letters mode (lower case);

(2) letters mode (shift for one character);

(3) letters mode (Caps Lock);

(4) Numbers/Symbols Mode (for one character);

(5) Numbers/Symbols Mode (Lock);

(6) Function Mode;

(7) Keypad Mode (Num Lock Off);

(8) Keypad Mode (Num Lock on);

(9) Control Key Depressed;

(10) Alternate Key Depressed; and

(11) Macro Mode.

The status lights are used to indicate to the user the current status of the keyboard 605 or 610. When the blue, yellow, and red status lights are all off, the keyboard 605 (or 610) is in the default letters mode. In the default letters mode, the user enters chords corresponding to lower case characters.

When the yellow and red lights are off, but the blue light is blinking slowly, this means that the keyboard 605 is in the Letters Mode (Shift), and the user enters a chord corresponding to an upper case character. (This is the same as the operation of the shift key on the standard keyboard 500.) However, when the blue light is on (as opposed to merely blinking) and the yellow and red lights are off, the keyboard 605 is in the Letters Mode (Caps Lock), and the user enters chords corresponding to upper case characters. (This is the same as the operation of the Caps Lock key on the standard keyboard 500.)

When the yellow and blue lights are off, but the red light is blinking slowly, this means that the keyboard 605 is in the Numbers/Symbols Mode, and the user enters a single chord corresponding to a number or symbol, including, for example, mathematical operators and punctuation marks. However, when the red light is on (as opposed to merely blinking) and the yellow and blue lights are off, the keyboard 605 is in the Numbers/Symbol Mode (Lock), and all chords entered by the user correspond to a number or symbol.

When the yellow and blue lights are off, but the red light is blinking fast, this means that the keyboard 605 is in the Functions Mode. In the Functions Mode chords entered into the keyboard 605 correspond to the function keys on the standard keyboard 500.

The Keypad Mode is on when the yellow light is on, but the blue and red lights are off, and the Keypad Mode is on with Num Lock when the yellow and red lights are both on and the blue light is off. In the Keypad Mode, users can enter chords corresponding to the numeric keys on the standard keyboard 500.

In many application programs, commands are entered in the computer 100 using the control (Ctrl) and alternate (Alt) keys on the standard keyboard 500. The chord keyboard 605 also supports the function of these keys. When the blue and red lights are off and the yellow light is blinking slowly, the keyboard 605 recognizes the following chord entered by the user as a control key, and when the blue and red lights are off and the yellow light is blinking fast, the keyboard 605 recognizes the following chord entered by the user as a alternate key.

For example, when the user wishes to enter Ctrl and the seventh function key on the standard keyboard 500, the user merely presses both the Ctrl and F7 keys simultaneously. With the chord keyboard 605, however, the user first enters the chord for Ctrl followed by the chord for the Function Mode. The keyboard 605 would then be in the Function Mode indicated by the fact that the red light is blinking fast. The keyboard 605 would also indicate that the Ctrl chord was entered by the yellow light blinking fast. The user can then enter the chord for the number seven. The chord keyboard 605 then, as discussed below, translates the chord for the number seven appropriately into the Ctrl and F7.

Finally, when all three status lights are blinking slowly, the keyboard 605 is in the Macro Mode and, chords entered by the user are translated by the keyboard 605 in accordance with the Macro operations discussed below.

According to the preferred embodiment, one chord keyboard, e.g., the right handed chord keyboard 610, may be connected to the computer 100 via the keyboard connector 225. This connection is made using a standard keyboard cable. Alternatively, the left handed chord keyboard 605 may be connected to the right handed chord keyboard 610 which is in turn connected to the computer 100, or a modified standard keyboard (discussed below) may be connected to a left handed chord keyboard 605, which is in turn connected to the computer 100. Additional configurations may be apparent to persons skilled in the art.

If a standard keyboard 500 of the type illustrated in FIG. 5 is used with the computer 100 and at least one chord keyboard, for example, right handed chord keyboard 610, the standard keyboard 500 must be connected as the last input device. In other words, using the preferred embodiment, the chord keyboard 610 cannot be connected to the standard keyboard 500; however, the standard keyboard 500 may be connected to the chord keyboard 610 that is connected to the computer 100. In this manner the present invention permits users to use both the standard keyboard 500 and a chord keyboard 610 simultaneously with the computer 100.

Figure 7:
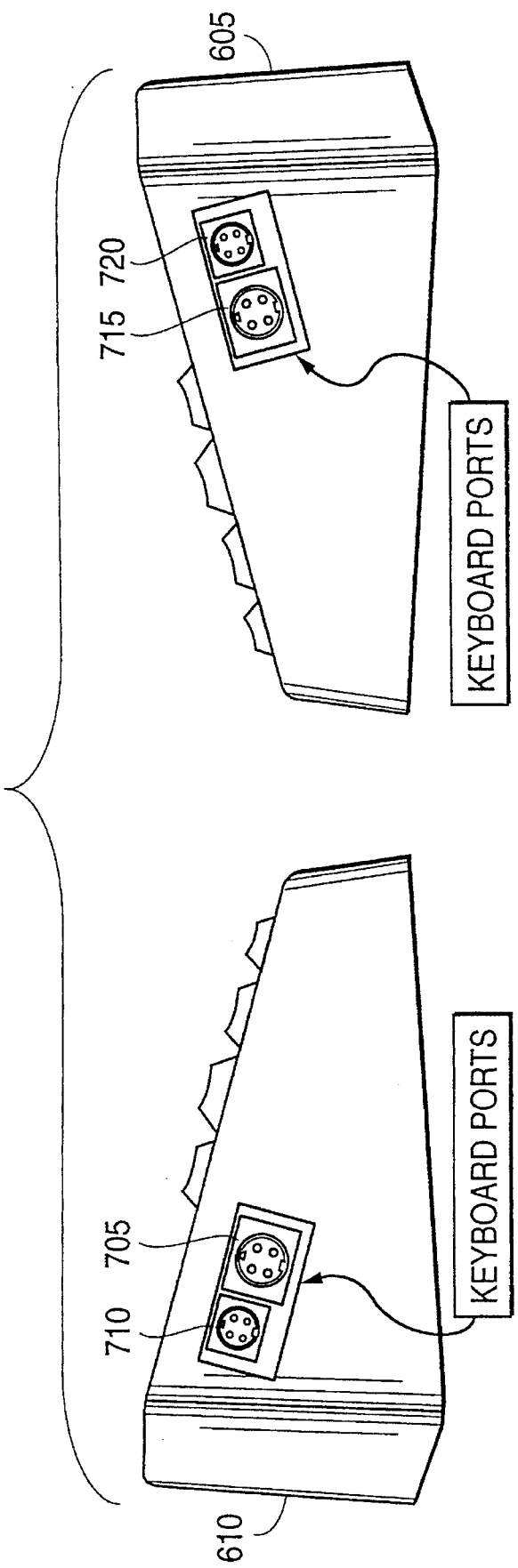
FIG. 7 is a rear view of the preferred embodiment of the present invention.

Referring to FIG. 7, an important feature of the preferred embodiment will be described. FIG. 7 shows the rear view of the keyboards 605 and 610. Each of the keyboards 605 and 610 includes an input port 705 and 715, and each includes an output port 710 and 720. These ports are used to connect multiple chord keyboards of the type illustrated in FIGS. 6 and 7 in a daisy chain fashion to a single keyboard port 225.

For example, in one configuration the output port 710 is used to connect the chord keyboard 610 to the computer 100 using the keyboard port 225. The input port 705 is used to connect the chord keyboard 610 to the chord keyboard 605 using the output port 720. In this configuration, two chord keyboards 610 and 605 may be connected to the computer 100 using the keyboard port 225.

Additional chord keyboards including the preferred embodiment of the present invention may also be connected to the computer 100 via keyboards 610 and 605 using the input port 715 of keyboard 605. In this configuration, three chord keyboards 610 and 605 may be connected to the computer 100 using the keyboard port 225.

Alternatively, a standard keyboard 500 of the type depicted in FIG. 5 may be connected to the computer 100 via the input port 715 of the keyboard 605. In this configuration, two chord keyboards 610 and 605 and one standard keyboard 500 may be connected to the computer 100 using the single keyboard port 225. Regardless of the selected configuration, conventional keyboard cables are used to connect multiple keyboards in a daisy chain fashion to the computer 100.

The internal components of each of the chord keyboards 605 and 610 according to the preferred embodiment will now be described with reference to FIG. 8. The chord keyboard 605 is comprised of seven key switch inputs 802, microprocessor 820, reset network 805, crystal oscillator network 810, firmware 825, external memory 830, two groups of buffers 833 and 837, an output connector 835, an input connector 840, and the status lights 617.

Each of the keys in, for example, the groups 615 and 625 of the chord keyboard 605 is connected to microprocessor 820 by the seven key switch inputs 802. In a manner similar to that described above with regard to the standard keyboard 500, the microprocessor 820 uses the inputs 802 to detect when keys from the groups 615 and 625 are pressed and released.

The preferred embodiment uses an 8051 microprocessor (manufactured by Intel Corporation); however, other microprocessors may also be used to implement the present invention. The microprocessor 820 also outputs signals to the status lights 617. These signals turn the lights on or off as is appropriate during operation of the keyboard 605.

The operation of the reset network 805 is generally known by those skilled in the art. The reset network 805 includes a capacitor and is connected to the microprocessor 820. Generally speaking, the reset network 805 resets the microprocessor's 820 pointers and registers, which allows the microprocessor 820 to begin executing program instructions from the firmware 825 at the appropriate point.

For example, when the microprocessor 820 first receives power (5 Volts) via the output connector 835 from a computer (e.g., the computer 100) or from another keyboard, the microprocessor 820 supplies the power to the other components of the keyboard 605. As soon as the reset network 805 first receives power, it instructs the microprocessor 820 to reset its pointers and registers, thereby permitting the microprocessor 820 to operate correctly when processing program instructions from the firmware 825 (discussed below).

The operation of the crystal oscillator network 810 is also generally known by those skilled in the art. The crystal oscillator network 810 includes a crystal and two capacitors, and is connected to the microprocessor 820. Generally speaking, the crystal oscillator network 810 is a type of clock that provides the microprocessor 820 with appropriate clock signals (timing) so the microprocessor 820 can perform specific operations, such as operations specified in the firmware 825.

The firmware 825 of the keyboard 605 will be described in detail below. In general, the firmware 825 consists of program instructions to the microprocessor 820 to manage the operations of the keyboard 605.

The external memory 830 is a RAM memory that is used by the microprocessor 820 when executing instructions from the firmware 825. The chord keyboard 605 is a table driven device. The tables used by the keyboard 605 are stored in the external memory 830. For example, the external memory 830 stores scan tables that are used by the microprocessor 820 (in conjunction with the firmware 825) to translate signals from the key switch inputs 802 corresponding to input chords. One of the tables is the default letters table, which includes the identification of input signals for chords and corresponding scan codes for letters. The external memory 830 also includes a word chord table that the microprocessor 820 uses to perform the word chord functions mentioned above. These functions will be described in detail below. Finally, the external memory 830 also holds a macro table that will also be discussed in detail below. As discussed below, a downloading process is used to transmit the information to be stored in the word chord and macro tables from the computer 100 when the keyboard 605 is directly connected to the computer 100.

The buffers 833 are connected between the microprocessor 820 and the output connector 835 (that corresponds to the output connector 720 illustrated in FIG. 7) with both a clock and data line. The buffers 837 are connected between the microprocessor 820 and the input connector 840 (that corresponds to the input connector 715) also with a clock and data line.

The buffers 833 hold data being received by the keyboard 605 from either the computer 100 or another keyboard connected between the keyboard 605 and the computer 100. The data line is used to transmit data, while the clock line is used to maintain appropriate timing between the microprocessor 820, the buffers 833 and the device connected to the output connected 835. The data in one of the buffers 833 may include a scan code corresponding to a chord entered on the keyboard 605 or on a keyboard attached (directly or indirectly) to the input connector 840, information for the proper setting of status lights 617, or a BAT Control Command (discussed below). One of the buffers 833 may also hold other scan codes that are not related to this description of the invention.

The buffers 837 are similar to the buffers 833. However, the buffers 837 are used to communicate between the microprocessor 820 and another keyboard, if any, connected to the keyboard 605 via the input connector 840. Again, the data line is used to transmit data, while the clock line is used to maintain appropriate timing between the microprocessor 820, the buffers 837 and the device connected to the input connected 840. The data in one of the buffers 837 may also include a scan code corresponding to a chord entered on a keyboard attached (directly or indirectly) to the input connector 840, information for the proper setting of status lights 617, or a BAT Control Command (discussed below).

Figure 8:
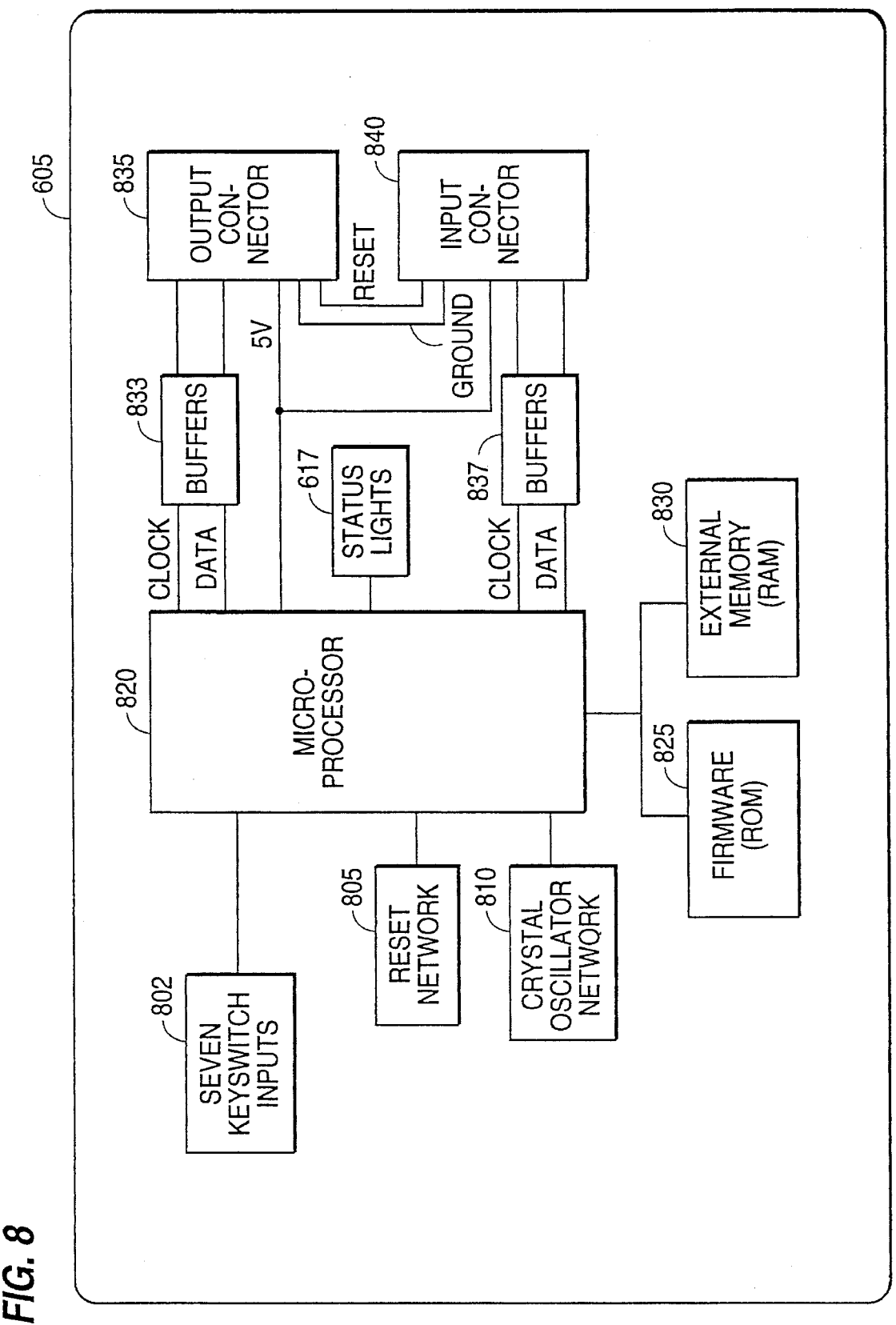
FIG. 8 is a block diagram illustrating the components of the preferred embodiment shown in FIGS. 6 and 7.

Also illustrated in FIG. 8 there are power, ground, and reset lines for the keyboard 605. The power line connects the output connector 835 with the microprocessor 820, and permits the flow of power between the device attached to the output connector 835 and the microprocessor 820. The power line is also connected to the input port 840, and facilitates the flow of power between the device attached to the output connector 835 (e.g., computer 100 or another keyboard) and the device, if any, attached to the input connector (e.g., another keyboard). Finally, the operations of the ground and rest lines are well known.

During operation of the keyboard 605, the microprocessor scans the keys (in groups 615 and 625) in a manner similar to that used by the standard keyboard 500 (FIG. 5).

However, using the keyboard 605, the user enters chords. Pressing a chord on the keyboard 605 causes a change in the current flowing through circuits associated with the key or group of keys that comprise the chord. The microprocessor 820 constantly scans the seven key switch inputs 802. It detects a signal corresponding to the increase or decrease in current from the chord (key or keys) that has been pressed. By detecting either a signal signifying an increase or a signal signifying a decrease in current, the microprocessor 820 can tell both when a chord has been pressed and when it has been released. Each chord has a unique signal. To distinguish between a real signal from a chord and an aberrant current fluctuation, the microprocessor 820 repeats the scan many times each second. Only signals detected by the microprocessor 820 for several consecutive scans are acted upon by the microprocessor 820.

Depending on which chord's signal is received by the microprocessor 820, the microprocessor 820 generates a scan code corresponding to the chord. There can be more than one scan code for each chord. Some chords generate a single scan code, some generate scan codes both when pressed and released, and some special chords (e.g., Print Screen) generate several scan codes when pressed. The microprocessor 820 stores the scan code in the keyboard's 605 buffers 833, and sends the scan code to the computer 100 via the connector 225 and the controller 470 (see FIGS. 2, 3, and 4) where it can be read by the computer's 100 ROM BIOS 480. Then, in a manner similar to the operation of the standard keyboard 500 discussed above, the keyboard controller 470 sends an interrupt signal to the ROM BIOS 480.

The ROM BIOS 480 contains an interrupt handler that reads the scan code from the keyboard controller 470, and processes it. The ROM BIOS 480 then sends a signal to the keyboard 605, via the controller 470, that tells the keyboard 605 that the ROM BIOS 480 received the scan code.

The ROM BIOS 480 includes a scan code table. The scan code table includes scan codes and the identification of, for example, characters associated with the scan code.

If the scan code is for Shift, Ctrl (control key), or Alt (alternate key), Num Lock, or Caps Lock, the ROM BIOS 480 changes two bytes in a special buffer area to reflect this special scan code. If the scan code is for a chord changing the mode of the keyboard 605, that is, Num Lock or Caps Lock, the ROM BIOS 480 transmits a signal to the microprocessor 820 (via the controller 470) to generate a signal to light the appropriate status light on the keyboard 605.

Finally, for all other keys, the ROM BIOS 480 checks the two bytes in the special buffer area to determine the status of the keyboard 605. Depending on the status indicated by two bytes, the ROM BIOS 480 translates the appropriate scan code into an ASCII code, used by the microprocessor 450, that stands for a character, a number, a function key, or a cursor movement key. In either case, the ROM BIOS 480 places the ASCII or special key code into the computer's 100 RAM 435, where it can be processed by microprocessor 450.

D. Daisy Chain Process

Reference will now be made to the pseudo code illustrated in FIG. 9 to explain the daisy chain process 900 of the firmware 825 of the chord keyboard 605. The same firmware 825 is included in each chord keyboard according to the preferred embodiment.

The daisy chain process 900 of the firmware 825 provides the capability to pass all data (e.g., signals indicating a change to the status lights) originating from the personal computer 100 through, for example, the microprocessor 820 of the keyboard 605 before reaching a microprocessor of a another chord keyboard, e.g., keyboard 610, according to the preferred embodiment. Similarly, data (e.g., scan code corresponding to chords) originating from a second chord keyboard, in this example, keyboard 610, passes through the first chord keyboard 605 before reaching the personal computer 100. In addition, each microprocessor (for keyboard 605 or keyboard 610) in a daisy chain configuration receives data and applies its own conditions to decide what should be done with the received data. It may 1) pass the data along unchanged, 2) modify the data then pass it along, 3) not pass the data at all, 4) use the data to make a decision and then send different data, or 5) process data originating at the keyboard. In this scheme, sending data is dependent upon the proper functioning of all microprocessors between one chord keyboard and a destination.

The following is a description of the steps used by the microprocessor 820 with the help of the daisy chain process 900 in the firmware 825 to move data up and down the daisy chain. For purposes of this discussion, "Parent" refers to the next unit upstream, that is, the unit connected to the output connector 805. This upstream unit may be a personal computer, e.g., computer 100, another chord keyboard, or modified standard keyboard according to the present invention. "Child" refers to the next unit downstream, which may be another chord keyboard according to the preferred embodiment, modified standard keyboard (discussed below), or standard keyboard 500 connected to the input connector 840. "Primary" refers to the chord keyboard according to the preferred embodiment that is connected directly to the personal computer 100. Finally, the term "word chord" refers to a special type of chord that will be discussed below in detail.

In FIG. 9, "BAT" refers to a chord keyboard, e.g. keyboard 605, according to the preferred embodiment. Accordingly, in the discussion below "BAT Child" refers to a BAT that is also the Child (or the next unit downstream). For purposes of the following discussion, the BAT Control Commands (in hexadecimal) are:

| BAT CONTROL COMMAND (Hex #) | Description |
|---|---|
| EF01 | Not a primary |
| EF04 | Shift |
| EF05 | Control |
| EF06 | Alt |
| EF07 | "did_match" = false |
| EF08 | "did_match" = true |
| EFF7 | Reset tables |
| EFF8 | Download done |
| EFF9 | Get table entry |

The "EF" prefix is a control byte, and each suffix, e.g., "01" represents an action byte. The control byte is used to inform the microprocessor 820 that an action byte will follow. The BAT Control Commands EF04, EF05, and EF06 are transmitted to any BAT Child (connected in a daisy chain according to the preferred embodiment) to indicate to the BAT Child that the Shift, Control, or Alt chord has been entered. The BAT Child uses the BAT Control Command to process the next chord entered by the user.

For example, in a configuration where two BAT keyboards are connected to a computer, the user may enter a chord corresponding to the Shift command on the BAT keyboard connected directly to the computer (the Primary) and then enter a chord on the second BAT keyboard (the Child). When the users enters the Shift chord on the Primary BAT, the Primary BAT transmits the BAT Control Command for the Shift chord to the BAT Child. (The Primary BAT also transmits the scan code for the Shift chord to the computer 100). The BAT Child then knows to adjust its status lights in accordance with the BAT Control Command for the Shift chord. Thus, in this example, if the user enters the Shift chord on the Primary BAT followed by the chord for the letter "a" on the BAT Child, the BAT Child will generate the appropriate scan code for "a" then reset the status light for the Shift chord and sends a scan code to the computer 100 via the Primary BAT. When the Primary BAT transmits the scan code it also resets its status light.

"Not a primary" (or "EF01") is the code used to indicate to other BAT keyboards that a keyboard is not a "Primary". For example, in a configuration where three or more BAT keyboards are connected to a computer, the second BAT would transmit an "EF01" BAT Control Command to the third BAT to inform the third BAT that the third BAT is not a Primary, that is, that there is another keyboard between the third BAT and the computer. Similarly, the first BAT (that is a Primary) sends the "EF01" BAT Control Command to the second BAT to inform the second BAT that the second BAT is not a Primary. Because, as detailed below, all "word chord" processing is done in a Primary BAT, it is useful for the second BAT and the third BAT in this example to know that they are not the Primary.

"did_match"=true or the "EF08" BAT Control Command is sent when a word chord (discussed below) has just been processed, otherwise "did_match=false" or the "EF07" BAT Control Command is set. For example, all word chord processing is performed by the Primary BAT and after the Primary BAT completes word chord processing, it sends the "EF08" BAT Control Command to any (direct or indirect) BAT Child of the Primary. A standard keyboard, e.g., keyboard 500, would not be sent the "EF08" BAT Control Command. Otherwise, the Primary and BAT Child, if any, has the "EF07" BAT Control Command set. Word chord processing is explained more fully below.

"Reset tables" (or BAT Control Command "EFF7" is sent to instruct a BAT Child, if any, to reset its current scan table to the default letters table, and delete any data the user downloaded from the computer 100. The "EFF7" BAT Control Command will be explained more fully below with regard to download processing.

"Download done" indicates completion of the downloading process where the user can generate certain tables, including word chord tables and macro tables, on the computer and download those tables to the external memory 830 of the keyboard 605 regardless of the keyboard's position in a chain.

Finally, the "Get table entry" is a command used during the downloading process discussed below. This command is used by the computer during the downloading process to inform the keyboard 605 (when it is a Primary) that the computer 100 is about to download an entry for a table stored in the external memory 830. When the computer 100 transmits a "Get table entry" command, the computer also sends information identifying the table and line number in the table that is being downloaded, as well as the information (e.g., scan codes for characters).

When the computer 100, with the chord keyboard 605 attached via the keyboard port 225, is turned on, power from the computer 100 begins to flow to the keyboard 605 (step 1). The lights 617 on the keyboard 605 are then turned on (step 2). Subsequently, the keyboard 605 performs appropriate boot up operations specified in the firmware 825. The boot up operations include initializing variables (discussed below) (step 3.1), turning the lights 617 on the keyboard 605 off (step 3.2), checking to determine whether a Child is connected to the keyboard 605, and setting appropriate variables (e.g., "did_match=false" and current table is the letters mode) in the external memory 830, firmware 825, and microprocessor 820 to indicate whether a Child is connected to the keyboard 605 and what type of Child, if any, is connected, and sending a message to the Parent to indicate that the keyboard 605 has been turned on and is ready for processing.

The processing continues with a loop of instructions (step 4), which are continuously performed by the microprocessor 820. First, the microprocessor 820 sets the lights 617 on the keyboard 605. In other words, the microprocessor 820 is constantly monitoring the current status of the keyboard 605, and if the user changes the status of the keyboard 605, the microprocessor 820 sets the lights 617 on the keyboard 605 to reflect a change in the status of the keyboard 605. For example, if the user presses the appropriate chord indicating a Caps Lock to enter the Letters Mode (Caps Lock), the microprocessor 820 updates that current status of the keyboard 605 and sets the blue light on the keyboard 605 to reflect the user's selection of the Caps Lock chord.

Alternatively, the status of the keyboard 605 may be changed by the computer 100 that it is connected to, or a BAT Child that is connected to the keyboard 605. For example, if a users enters a chord changing the status of the a BAT Child connected to the keyboard 605, the microprocessor 820 learns of the change in the BAT Child's status (via the input connector 840 and the buffer 837). The microprocessor 820 then changes its status to reflect a change in the status of the BAT Child.

During the loop (step 4), the microprocessor 820 performs different sets of operations, depending upon whether the microprocessor 820 receives a scan code, BAT Control Command, or other code (e.g., reset code from computer, codes concerning status light settings, and acknowledgment signals from the computer indicating receipt of, for example, a scan code) from a Parent or Child, or whether it receives a signal from the keys in groups 615 and 625 (FIG. 6).

If the microprocessor 820 receives a scan code from a Parent, then it performs the operations illustrated in the steps 4.2. However, if the microprocessor 820 receives a scan code from a Child, then it performs the operations illustrated in the steps 4.3. Finally, if the microprocessor 820 receives a signal for an input chord from the keys in groups 615 and 625 associated with the same keyboard 605 as the microprocessor 820, then the microprocessor 820 performs the operations of the steps 4.4.

In steps 4.2, the microprocessor 820 first determines whether it received a scan code from a Parent (step 4.2.1). If so, then it performs step 4.2.2. In step 4.2.2, the microprocessor 820 processes the received input scan code and sends an output scan code to the Child connected to the keyboard 605, depending upon following three situations:

a. If the microprocessor 820 received a special reset code (or a code from the computer 100 signalling the keyboard 605 to reset itself) and a BAT Child is connected to the keyboard 605, then the microprocessor 820 sends an appropriate BAT Control Command to Child to tell the Child that it is not a Primary BAT. As specified above, the BAT Control Command in this situation is "EF01".

b. If the microprocessor 820 receives a BAT Control Command and a BAT Child is connected to the keyboard 605, then the microprocessor 820 performs appropriate steps to send the received BAT Control Command to the Child.

c. If the microprocessor 820 receives something other than a BAT Control Command, e.g., a scan code, and a Child is connected to the keyboard 605 (BAT or other type of keyboard), then the microprocessor performs appropriate steps to send the received code to the Child.

In steps 4.3, the microprocessor 820 first determines whether it received a scan code from a Child (step 4.3.1). If so, then it performs step 4.3.2. (The scan code corresponds to a chord if the Child is a BAT; otherwise the scan code corresponds to an input key from a standard keyboard.) In step 4.3.2, the microprocessor 820 processes the received scan code and sends an output scan code to the Parent connected to the keyboard 605, depending upon following three situations:

a. If the microprocessor 820 receives a scan code, then it performs appropriate steps to send the received scan code to its Parent.

b. If the microprocessor 820 receives a scan code indicating a change in the toggle status of the keyboard 605, i.e., "Shift", "Ctrl", "Alt", then it performs appropriate steps to change the toggle status of the keyboard 605 (and in step 4.1 the lights 617 will be changed in accordance with the change to the toggle status of the keyboard 605).

c. If the microprocessor 820 receives a scan code for an input word chord then it may perform one of two functions, depending upon whether the keyboard 605 is a Primary". If the keyboard 605 is a Primary, then the microprocessor 820 will perform appropriate steps to process the word chord. Otherwise (when the keyboard 605 is not a Primary), the microprocessor 820 simply sends the scan code for the word chord to the Parent of keyboard 605.

Finally, in steps 4.4, the microprocessor 820 determines whether it received a signal for an input chord from keys from the groups 625 and 615 of the keyboard 605 (step 4.4.1). In other words, in step 4.4.2, the microprocessor 820 processes key input originating in the keyboard 605. In step 4.4.2, the microprocessor 820 processes the signal for the input chord originating from the keyboard 605, depending upon following situations:

a. If the signal for the input chord is toggle status (i.e., Shift, Control, Alt), then the microprocessor 820 sends an appropriate BAT Control Command corresponding to the status toggle to its Child, if any, connected to the keyboard 605, and it also sends the scan code for the chord (not the BAT Control Command) to the Parent connected to the keyboard 605. If the keyboard 605 is the Primary (that is, keyboard 605 is connected to the computer 100), then the microprocessor 820 sends the scan code for the chord indicating a toggle status to the computer 100 (via the keyboard port 225).

b. If the microprocessor 820 receives a signal for an input word chord which causes a change to the "did_match" variable, then the microprocessor 820 sends the proper BAT Control Command ("EF07" or "EF08") to a Child, if any, connected to the keyboard 605, and nothing to Parent ("did_match" is true ("EF08") if the microprocessor 820 just processed a word chord; otherwise it is false).

c. Finally, for all other signals for chord that the microprocessor 820 receives, it sends a corresponding scan code only to the Parent of the keyboard 605. If its Parent is the computer 100, then the scan code has reached the end of the daisy chain and is processed by the computer 100 as explained above. If its Parent is another BAT, then the microprocessor of the Parent BAT will perform the functions described in step 4.3.2 above.

The daisy chain capability allows the chord keyboard according to the preferred embodiment to use more than one device connected to the keyboard port 225 of the computer 100.

E. Download Processing

The download process is an application program that runs in the microprocessor 450 of the computer 100. While executing the steps of the download process the microprocessor communicates with the microprocessor 820 via the connector 835.

The download process allows the user to send (or download) user-defined macro and word chord entries from the computer 100 to a keyboard, e.g., keyboard 605, to be stored in the tables in the external memory 830. The user executes an application program for the download process on the computer 100 that allows the user to edit (modify, delete, or add) entries in the macro and word chord tables stored in the disk 405 (or other storage medium). The user may also use the download process program to download one or more edited tables to the keyboard 605 via the keyboard port 225.

The download process program uses some of the BAT Control Commands described above. Using the download process, the user sends bytes of data from the computer 100 to the keyboard 605 and the keyboard 605 sends an acknowledgment byte, hexadecimal "FA", to acknowledge receipt of each byte from the computer 100. If the download process program running in the computer 100 does not receive the acknowledgment byte from the keyboard 605 when one is expected, it will try sending the data to the keyboard 605 one or more times. If still no acknowledgment byte is received by the download process program, the program returns an error message to the user and execution of the download process terminates. The keyboard 605 may also return a byte other than the acknowledgment byte (e.g., hexadecimal "32" to indicate a memory error), which the download process program processes according to the error type.

In another implementation using the present invention with Microsoft's WINDOWS™, communication with the keyboard 605 requires additional steps because WINDOWS™ maintains greater input/output control versus the previously discussed implementation using Microsoft's DOS. This implementation uses the keyboard status port and the keyboard data port, both of which are well known to those skilled in the art.

This implmentation requires that the statement "8042WriteCmd=EF,1" be in the "[386Enh]" section of the WINDOWS™ "system.ini" file. This statement informs WINDOWS™ that, after an "EF" byte is sent to the keyboard status port, another byte will be sent to the keyboard data port. The "8042WriteCmd=EF,1" is used to tell WINDOWS™ how many bytes (i.e., one byte) to buffer in the keyboard data port before the byte(s) is/are sent to the keyboard 605. With this statement activated (loaded in the "system.ini" file), the download process can send bytes to the keyboard 605 by writing the hexadecimal byte "EF" to the keyboard status port before sending each byte to the keyboard data port. (The "EF" byte used here is not related to the "EF" prefix byte used in the BAT Control Commands.) Subsequently, the keyboard controller 470 sends the byte(s) from the keyboard data port to the keyboard 605. This implementation may be used with either WINDOWS™ or DOS.

For each entry or line in the table the user is downloading, the download process program first sends the BAT Control Command for "Get Table Entry" (i.e., hexadecimal "EFF8"). As described above, this means that the download process sends a control byte (i.e., hexadecimal "EF") followed by the action byte (i.e., hexadecimal "F8").

To modify an entry in one of the tables stored in the external memory 830, in addition to the BAT Control Command for "Get Table Entry", the download process sends three bytes to indicate the table and entry being downloaded. The first byte downloaded indicates the table. There are three tables: Macro1 table, Macro2 table, and word chord table. When the download process downloads a "4", this means that the user intends to modify (add, change, or delete) an entry in the Macro1 table. A downloaded "5" means that the user intends to modify an entry in the Macro2 table, and a downloaded "6" means that the user intends to modify an entry in the word chord table.

The second byte that the computer 100 (running the download process program) sends to the keyboard 605 indicates the line number in the table (identified by the first byte) that will be modified, and the third byte indicates the number of characters that will be sent. Finally, the computer 100 sends all of the bytes (for the characters) to be stored in the specified table and the selected line.

The final byte sent is a null byte ("0"), which indicates the end of the bytes being downloaded to be stored in the specified table and the selected line. After the null byte is sent to the keyboard 605, the computer 100 waits for a first acknowledgment byte from the keyboard 605 that indicates receipt of the null byte and a second acknowledgment byte that indicates that the download was successfully completed. The same procedure is repeated for each entry in the selected table until all entries have been downloaded to the keyboard 605.

When the download process is done sending all lines the user requested, the download process sends the BAT Control Command "Download Done" (i.e., "EFF9"). Again, this means that the control byte is first sent (hexadecimal "EF") followed by the action byte ("F9"). The download process program then waits for the acknowledgment byte from the keyboard 605, then continues with normal operation as the download process is now complete. The user may then exit the download process program, and the macro and word chord tables will be active and available for use. Since the modified tables are stored in the keyboard 605, the computer 100 can return to normal operation with no special software needed for processing macro and word chord tables. The macro and word chord table processing is performed in the keyboard 605 as explained below.

F. Macro and Word Chord Processing

As suggested above, the present invention also allows users to define tables of macros, as well as word chord tables, on the personal computer 100 and then, using the downloading process discussed above, to download all such information to the external memory 830 in the chord keyboard 605. Once the macro and the word chord tables are defined and downloaded into the external memory 830, the user can access this downloaded information in the manner described below.

The chord keyboard 605 allows users to activate a macro by depressing the macro chord (i.e., Macro1 or Macro2) followed by a selected chord which instructs the chord keyboard 605 to generate, for example, other scan codes representing, for example, a word to be sent to the computer 100. The chord keyboard 605 also allows users to enter one or more chords that represent a "short form" followed by the word chord, which, as discussed above, instructs the chord keyboard 605, if it is a Primary to identify a "long form" (stored in the external memory 830) for the short form and, for example, to replace the short form displayed on the screen 422 connected to the computer 100, with the stored long form.

The following is a brief description of the steps used by the microprocessor using the firmware 825 for the macro function.

1. If the chord keyboard user enters a macro chord (i.e., Macro1 or Macro2), the microprocessor 820 signals a change to the status lights as described above, and processes the next chord in the macro mode using a corresponding macro table stored in the external memory 830. For example, if the user enters the Macro1 chord, then the macro table for that chord is used to process the following chord.

2. If the user then enters the "lock" chord immediately after the macro chord, the microprocessor 820 interprets all subsequent input chords in accordance with the macro table selected in the previous step.

3. If the user has not "locked" into the selected macro table, then the microprocessor 820 returns to the mode (using the appropriate table) that it was in prior to step 1, for example, the default letters mode (using the letters table for chord processing).

The following is a brief description of the steps included in the firmware 825 that provide the microprocessor with the capability to process word chords. One important distinction between macro processing and word chord processing is that macro processing is performed by each chord keyboard connected in a chain to the computer; whereas all word chord processing is performed only by the chord keyboard attached directly to the computer (the Primary).

1. First, the user enters one or more chords in a normal manner on keyboard 605, or presses one or more keys on a standard keyboard connected to the keyboard 605.

2. When the user enters the word chord, on the chord keyboard 605 (whether it is a Primary or other chord keyboard in a chain), if the keyboard 605 is a Primary then microprocessor 820, again with the help of the firmware 825, looks backward in a special buffer to find the last delimiter the user typed. (The delimiter set is predefined and includes, for example, comma, space, enter, and period.)

3. If a backspace is found, both the backspace and character before it are omitted.

4. If no delimiter is found within the last ten characters, then processing is terminated.

5. Otherwise, the microprocessor 820 recognizes the input chords entered in step 1, without the delimiter as a "short form".

6. With a short form identified, the microprocessor 820 searches for an identical short form in its word chord table stored in the external memory 830.

7. If no match is found, word chord processing is terminated.

8. Otherwise, the microprocessor 820 sends one or more scan codes for the destructive backspace to the computer 100 (in accordance with the daisy chain process 900) to delete the current short form that, for purposes of this example, is being displayed on the user's screen 422.

9. The microprocessor 820 then sends scan codes for the matching "long form" stored in the word chord table to the computer 100 to be displayed on the user's screen 422.

10. The microprocessor 820 then sends the scan code for a blank space to the computer 100 and it is also displayed, unless the user specified otherwise. In other words, the user may decide to instruct the microprocessor 820 not to perform this step.

11. If a blank space was appended to the long form and the next scan code received by the microprocessor 820 is a predefined delimiter (such as comma, period, etc.), the microprocessor 820 sends scan codes for the destructive backspace and the new delimiter to the computer 100. This effectively replaces the trailing space with the new delimiter.

12. The chord keyboard 605 then returns to normal processing.

G. Modified Standard Keyboard

In an alternative configuration, the present invention may be comprised of a modified standard keyboard. The modified standard keyboard includes a keyboard of the type illustrated in FIG. 5 with the internal components illustrated in and described with reference to FIG. 8. Using a modified standard keyboard, multiple modified standard keyboards or chord keyboards according to the present invention can be connected in a daisy chain fashion to the personal computer 100.

CONCLUSION

Persons skilled in the art will recognize that the present invention described above accomplishes the objects discussed above and more. They will also recognize that modifications and variations may be made to this invention without departing from the spirit and scope of the general inventive concept. This invention in its broader aspects is therefore not limited to the specific details or representative methods shown and described.

We claim:

1. A keyboard system comprising:

a plurality of keys corresponding to characters;

an input connector for connecting the keyboard system to a child keyboard system that includes a plurality of keys corresponding to characters;

an output connector, for connecting the keyboard system to one of a computer, via a keyboard port of the computer, and a parent keyboard system that includes a plurality of keys corresponding to characters;

means for receiving an input character generated by pressing a key on one of the keyboard system and the child keyboard system when the child keyboard system is connected to the input connector; and processing and outputting means for processing the received input character, and for outputting a processed character to the computer when the computer is connected to the output connector and to the parent keyboard system when the parent keyboard system is connected to the output connector.

2. The keyboard system of claim 1, wherein the computer is a personal computer compatible with IBM compatible personal computers.

3. A method for processing an input character in a keyboard system having a plurality of keys corresponding to alphanumeric characters, the keyboard system having an input connector and an output connecter, wherein a child keyboard system that includes a plurality of keys corresponding to characters is connected to the input connector and one of a computer and a parent keyboard system that includes a plurality of keys corresponding to characters is connected to the output connector, the method including the steps of:

receiving an input character from one of four sources including the plurality of keys on the keyboard system, the child keyboard system, the parent keyboard system, and the computer;

identifying the source of the input character;

processing the input character depending upon the source of the input character; and outputting the processed input character.

4. The keyboard system of claim 3, wherein the computer is a personal computer compatible with IBM compatible personal computers.

5. A chord keyboard system comprising:

a plurality of keys;

a memory for storing a table including scan codes corresponding to chords;

an input connector for connecting the chord keyboard system to a child chord keyboard system that includes a plurality of keys;

an output connector for connecting the chord keyboard system to one of a computer, via a keyboard port of the computer, and a parent keyboard system;

means for receiving an input chord generated by pressing at least one of the plurality of keys of the chord keyboard system and the child chord keyboard system when the child chord keyboard system is connected to the input connector and the parent keyboard system is connected to the output connector, and for receiving an input chord generated by pressing at least one of the plurality of keys of the chord keyboard system and the child chord keyboard system when the child chord keyboard system is connected to the input connector and the chord keyboard system is connected to the computer, and for receiving an input chord generated by pressing at least one of the plurality of keys on the chord keyboard system when the chord keyboard system is connected to the computer; and processing and outputting means for processing the received input chord by identifying a scan code in the stored table corresponding to the input chord, and for outputting the identified scan code to the computer when the computer is connected to the output connector and to the parent keyboard system when the parent keyboard system is connected to the output connector.

6. The keyboard system of claim 5, wherein the computer is a personal computer compatible with IBM compatible personal computers.

7. A method for processing an input chord in a chord keyboard system having a plurality of keys, a memory for storing at least one scan code corresponding to a chord, an input connector, and an output connecter, wherein a child keyboard system that includes a plurality of keys is connected to the input connector, and one of a computer and a parent keyboard system that includes a plurality of keys is connected to the output connector, the method including the steps of:

receiving the scan code from one of two sources including the plurality of keys on the chord keyboard system and the child keyboard system and storing the scan code in the memory;

identifying the source of the scan code;

processing the scan code depending upon the identified source of the scan code; and outputting the processed scan code to one of the computer and the parent keyboard system that is connected to the output connector.

8. The keyboard system of claim 7, wherein the computer is a personal computer compatible with IBM compatible personal computers.

9. The method of claim 7 further including the steps of:

receiving scan code from one of the computer and the parent keyboard system;

processing the scan code; and outputting the processed scan code to the child keyboard system connected to the input connector.

10. A chord keyboard system comprising:

a plurality of keys;

a memory for storing a table including scan codes corresponding to chords;

an input connector for connecting the chord keyboard system to a child keyboard system that includes a plurality of keys;

an output connector for connecting the chord keyboard system to one of a computer, via a keyboard port of the computer, and a parent keyboard system;

means for receiving an input chord generated by pressing a key on the chord keyboard system; and processing and outputting means for processing the received input chord by identifying a scan code in the stored table corresponding to the input chord, and for outputting the identified scan code to the computer when the computer is connected to the output connector and to the parent keyboard system when the parent keyboard system is connected to the output connector.

11. The keyboard system of claim 10, wherein the computer is a personal computer compatible with IBM compatible personal computers.

12. A chord keyboard system comprising:

a plurality of keys;

a memory for storing scan codes corresponding to chords;

an input connector for connecting the chord keyboard system to a child keyboard system that includes a plurality of keys;

an output connector for connecting the chord keyboard system to a parent keyboard system;

means for receiving an input chord generated by pressing a key on the chord keyboard system; and processing and outputting means for processing the received input chord by identifying a scan code in the stored table corresponding to the input chord, and for outputting the identified scan code to the parent keyboard system when the parent keyboard system is connected to the output connector.

13. The keyboard system of claim 12, wherein the parent keyboard system is a personal computer compatible with IBM compatible personal computers.

14. A chord keyboard system comprising:

a plurality of keys;

a memory for storing a table including scan codes corresponding to chords;

an input connector for connecting the chord keyboard system to a child keyboard system that includes a plurality of keys;

an output connector for connecting the chord keyboard system to one of a computer, via a keyboard port of the computer, and parent keyboard system;

means for receiving an input code from the child keyboard system;

processing means for processing the received input code; and outputting means for outputting the processed input code to the computer when the computer is connected to the output connector and to the parent keyboard system when the parent keyboard system is connected to the output connector.

15. The keyboard system of claim 14, wherein the computer is a personal computer compatible with IBM compatible personal computers.

16. A method for processing an input character in a keyboard system having a plurality of keys corresponding to alphanumeric characters, the keyboard system having an input connector and an output connecter, wherein a child keyboard system that includes a plurality of keys corresponding to characters is connected to the input connector and one of a computer and a parent keyboard system that includes a plurality of keys corresponding to characters is connected to the output connector, the method including the steps of:

receiving an input character from one of four sources including the plurality of keys on the keyboard system, the child keyboard system, the parent keyboard system, and the computer;

identifying the source of the input character; and processing the input character depending upon the source of the input character.

17. The keyboard system of claim 16, wherein the computer is a personal computer compatible with IBM compatible personal computers.

* * * * *